United States Patent
Georgin

(10) Patent No.: US 9,511,854 B2
(45) Date of Patent: Dec. 6, 2016

(54) LOAD CELL GAIN COMPENSATION

(71) Applicant: Goodrich Corporation, Charlotte, NC (US)

(72) Inventor: Marc Georgin, Dayton, OH (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 14/707,456

(22) Filed: May 8, 2015

(65) Prior Publication Data

US 2016/0325827 A1 Nov. 10, 2016

(51) Int. Cl.
*B60T 8/17* (2006.01)
*B64C 25/44* (2006.01)

(52) U.S. Cl.
CPC ............ *B64C 25/44* (2013.01); *B60T 8/1703* (2013.01)

(58) Field of Classification Search
CPC .......... F16D 66/00; B60T 8/00; B60T 13/741; B60T 13/746
USPC ... 188/156, 72.8; 303/20, 89; 701/36, 37, 38
See application file for complete search history.

(56) References Cited

U.S. PATENT DOCUMENTS

| | | | |
|---|---|---|---|
| 7,046,496 B2 | 5/2006 | Hsin | |
| 7,281,431 B2 | 10/2007 | Englund | |
| 7,373,836 B2 | 5/2008 | Bohr | |
| 8,835,779 B2 | 9/2014 | Tippanna Talikoti | |
| 2005/0269872 A1* | 12/2005 | Ralea | B60T 8/00 303/20 |
| 2007/0084682 A1* | 4/2007 | Griffith | B60T 8/00 188/156 |
| 2007/0261926 A1* | 11/2007 | Dalton | B60T 13/746 188/72.8 |
| 2008/0084109 A1* | 4/2008 | Griffith | B60T 13/746 303/89 |
| 2009/0218179 A1* | 9/2009 | Yokoyama | B60T 13/741 188/1.11 L |
| 2016/0001753 A1* | 1/2016 | Georgin | B60T 8/1703 303/20 |

* cited by examiner

*Primary Examiner* — Thomas G Black
*Assistant Examiner* — Wae Louie
(74) *Attorney, Agent, or Firm* — Snell & Wilmer, L.L.P.

(57) ABSTRACT

The present disclosure relates to load cell gain compensation, and more particularly, to a system that compensates for the effect of parasitic resistances on the behavior of brakes having load cells. The load cell gain compensation may be in response to an error representing the ratio of an instantaneous current to an expected current. In various embodiments, the gain compensation may enhance brake component performance.

20 Claims, 3 Drawing Sheets

LOAD CELL GAIN COMPENSATION

FIELD

The present disclosure relates to load cells, and more particularly, to a gain compensation system for load cells.

BACKGROUND

Aircraft brake control systems receive input signal(s) indicating, for example the desired actuator braking force/the desired rate of deceleration and transmit an output signal to a brake actuator. The output signal may direct a brake actuator to exert a braking force on a brake stack. The aircraft brake control system may have a sensor that monitors the braking force exerted on the brake stack. An electric brake actuation controller may modulate the output signal to match the applied braking force to a desired braking force. However, connecting wires between the electric brake actuation controller and the brake actuator may corrode and/or degrade. Thus, the currents, voltages, and/or signals may be degraded. As such, the electric brake actuation controller may provide an output signal directing the brake actuator to exert a force greater than desired. Thus, there may be an error between the desired braking force and the applied braking force. This error may increase component wear.

SUMMARY

According to various embodiments, a method of load cell gain compensation is disclosed. The method may include determining, by an electric brake actuator controller, a nominal load cell current during a first operating condition, measuring, by the electric brake actuator controller, a load cell current of a load cell by an electric brake actuator, and comparing, by the electric brake actuator controller, the load cell current and the nominal load cell current. The method may further include adjusting, by the electric brake actuator controller, a load cell gain in response to the load cell current being less than the nominal load cell current.

According to various embodiments, a brake control system is disclosed. The brake control system may include an electric brake actuation controller ("EBAC"), an electric brake actuator ("EBA"), and a load cell proximate to a brake. The EBAC may be connected by sense wiring to the load cell and may receive a sense voltage from the load cell via the sense wiring. The EBAC may be connected by power wiring to the load cell and may provide a load cell current (and voltage) from the EBAC to the load cell via the power wiring. The EBAC may be connected by control wiring to the EBA and may provide a control voltage to the EBA from the EBAC via the control wiring. The EBAC may offset the control voltage in response to the load cell current being less than a nominal load cell current. In various embodiments, the load cell is situated inside the EBA.

According to various embodiments, a brake control system is disclosed. The brake control system may include an electric brake actuation controller ("EBAC"). The brake control system may further include sense wiring connected to the EBAC, wherein the EBAC is configured to receive a sense voltage from a load cell via the sense wiring, power wiring connected to the EBAC, wherein the EBAC is configured to provide a load cell current to the load cell via the power wiring, and control wiring connected to the EBAC, wherein the EBAC is configured to provide a control voltage to an electric brake actuator ("EBA") via the control wiring. The EBAC may offset the control voltage in response to the load cell current being less than a nominal load cell current.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1A:
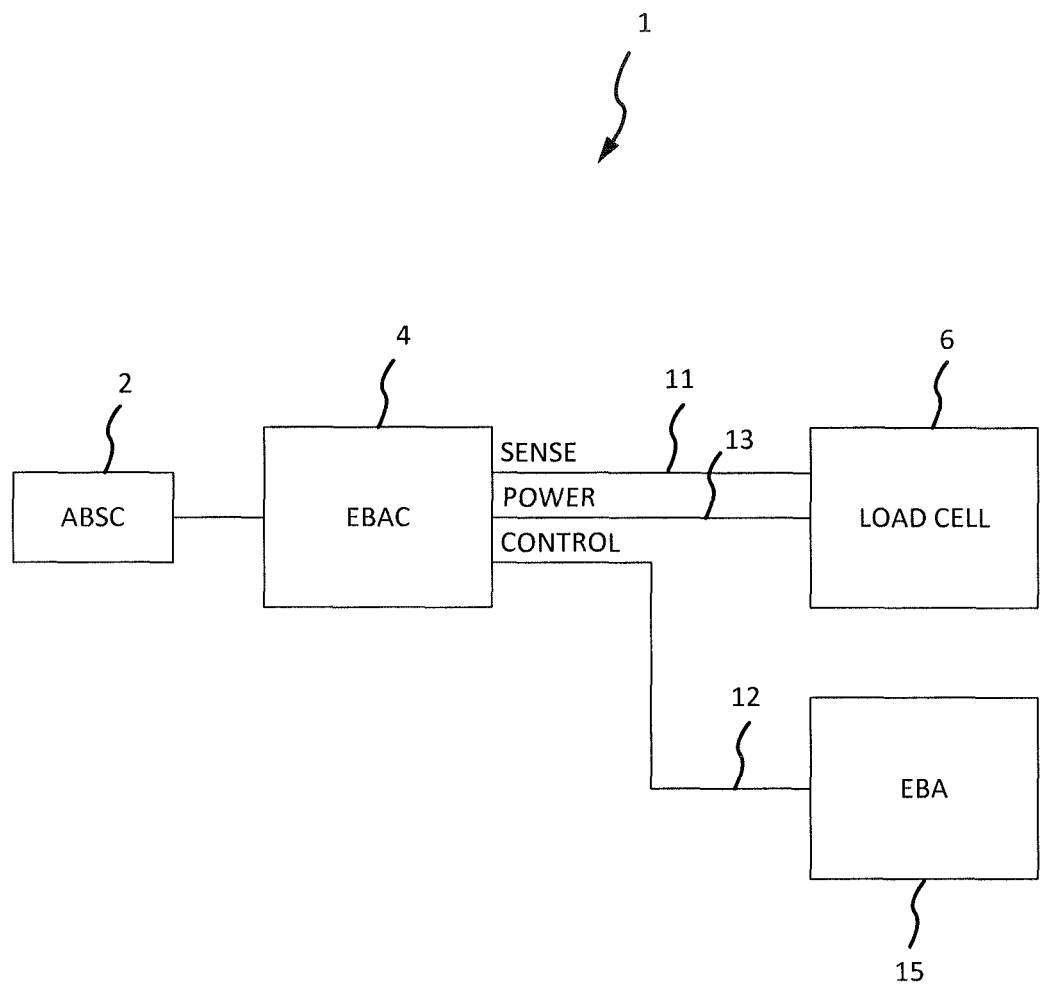
FIG. 1A depicts an example aircraft braking system, in accordance with various embodiments.
Figure 1B:
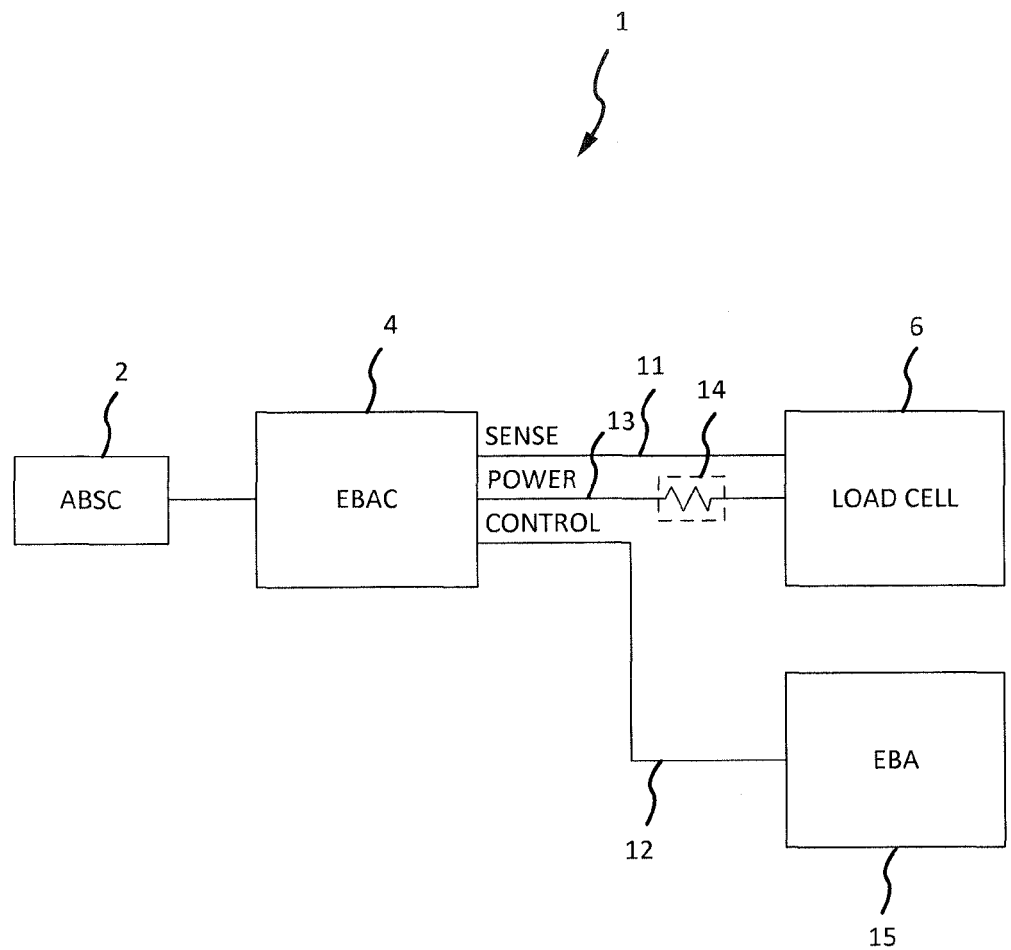
FIG. 1B depicts an example aircraft braking system having parasitic resistance, in accordance with various embodiments.

The present disclosure relates to a brake control system, such as an aircraft brake control system. With reference to FIGS. 1A-B, in accordance with various embodiments, a brake control system 1 may have an aircraft brake and steering controller 2 ("ABSC"), an electrical brake actuation controller 4 ("EBAC"), a load cell 6, and an electric brake actuator ("EBA") 15. In various embodiments, the load cell 6 is situated inside the EBA 15. The EBAC 4 may provide force commands to the EBA 15 directing the EBA 15 to cause a brake assembly to mechanically operate, moving the aircraft brakes. For example, the EBAC 4 may be responsible for executing brake actuation instructions received from an aircraft brake and steering controller 2 ("ABSC"). In this manner, the brakes may be operated. In various embodiments, the EBAC 4 may provide force commands to more than one EBA 15, for example, a first EBA and a second EBA, or any number of EBAs, in order to operate more than one brake assembly, for example, a first brake assembly and a second brake assembly in concert. Each brake assembly may be installed on an aircraft main landing gear.

The force commands and brake actuation instructions may comprise signals from various different sources. For example, the force commands and/or brake actuation instructions may be an interpretation of brake pedal application (e.g., an amount of brake pedal deflection). The force commands and/or brake actuation instructions may be an interpretation of manual and/or auto-brake instructions corresponding to a desired aircraft deceleration rate. Furthermore, noise, such as small and/or inadvertent brake movements, for example, pedal movements may be present and may be filtered by at least one of the ABSC 2 and/or EBAC 4.

During a braking event, the ABSC 2 may provide brake actuation instructions to the EBAC 4 directing a certain percentage of brake actuation, for example, scaled from about 0% actuation to about 100% actuation. The EBAC 4 may create a force command in response to the brake actuation instruction and/or past or expected brake actuation instructions (such as according to a filter). This force command may correspond to a desired braking force. The force command may be represented by a control voltage applied to control wiring 12. The control wiring 12 may connect the EBAC 4 to an EBA 15. The EBA 15 may actuate in response to the magnitude of the control voltage representing the desired braking force. However, as one may appreciate, the force command may be represented by a current, or by packetized data, or by a waveform, or any mechanism of electronically conveying information as desired.

The electrical brake actuator 15 may be in mechanical communication with a load cell 6. In various embodiments, the load cell 6 is situated inside the electric brake actuator 15. The load cell 6 may comprise a sensor configured to detect the magnitude of the force exerted by the electrical brake actuator 15 on a brake. Thus, the load cell 6 may detect the actual braking force that is actually applied by the electrical brake actuator 15 on the brake. The load cell 6 may be electrically connected, such as by wiring, to the EBAC 4. This electrical connection may comprise sense wiring 11. Sense wiring 11 may comprise wiring that conveys information representative of the actual braking force exerted by the electrical brake actuator 15. In various embodiments, this information comprises a voltage having a magnitude corresponding to the actual braking force ("sense voltage"). However, as illustrated in FIG. 1B, a parasitic resistance 14 may develop in power wiring 13 (discussed below), causing the correspondence of the sense voltage (conveyed on the sense wiring 11) to the actual braking force to change, such as by a constant multiple ("error multiple").

The load cell 6 may further be connected to the EBAC 4 by wiring, such as power wiring 13. Power wiring 13 may comprise wiring that conveys electrical power to the load cell 6 so that the load cell 6 may operate. Since the load cell 6 is powered by power wiring 13 from the EBAC 4 and provides a sense voltage via sense wiring 11 to the EBAC 4, one will appreciate that the EBAC 4 may mathematically relate the power drawn on the power wiring 13 to the sense voltage provided on the sense wiring 11. Moreover, anomalies in the current and/or voltage provided on the power wiring 13, such as caused by a parasitic resistance 14 (FIG. 1B), may introduce anomalies in the sense voltage provided on the sense wiring 11. Various methods to relate these values are discussed herein.

Over time, the power wiring 13 may develop a parasitic resistance 14. For instance, the power wiring 13 may run through connectors, may be exposed to harsh conditions, may be exposed to corrosive conditions, or otherwise may develop a parasitic resistance 14. A parasitic resistance 14 may comprise a resistance disposed in the power wiring 13. The parasitic resistance 14 may arise from wear, degradation, corrosion, introduction of connectors, repair, and/or the like.

As such, the sense voltage that is conveyed along the sense wiring 11 may be changed. Stated differently, the correspondence of the sense voltage to the actual braking force may change by an error multiple due to the change in voltage and/or current provided to the load cell 6 via power wiring 13 (which has a parasitic resistance 14). In various embodiments, the sense voltage may diminish in magnitude in response to the parasitic resistance 14. Thus, the information may be distorted so that the sense voltage no longer corresponds to the actual actuation, but deviates. For instance the EBAC 4 may receive information representative of the magnitude of the force exerted by the electrical brake actuator 15 indicating the exerted force is less than is actually applied to a brake. As such, the EBAC 4, perceiving an inadequate applied force, may provide a control voltage on the control wiring 12 directing the EBA 15 to provide an increased force. Thus, the actual force applied to a brake may be much greater than desired.

Figure 2:
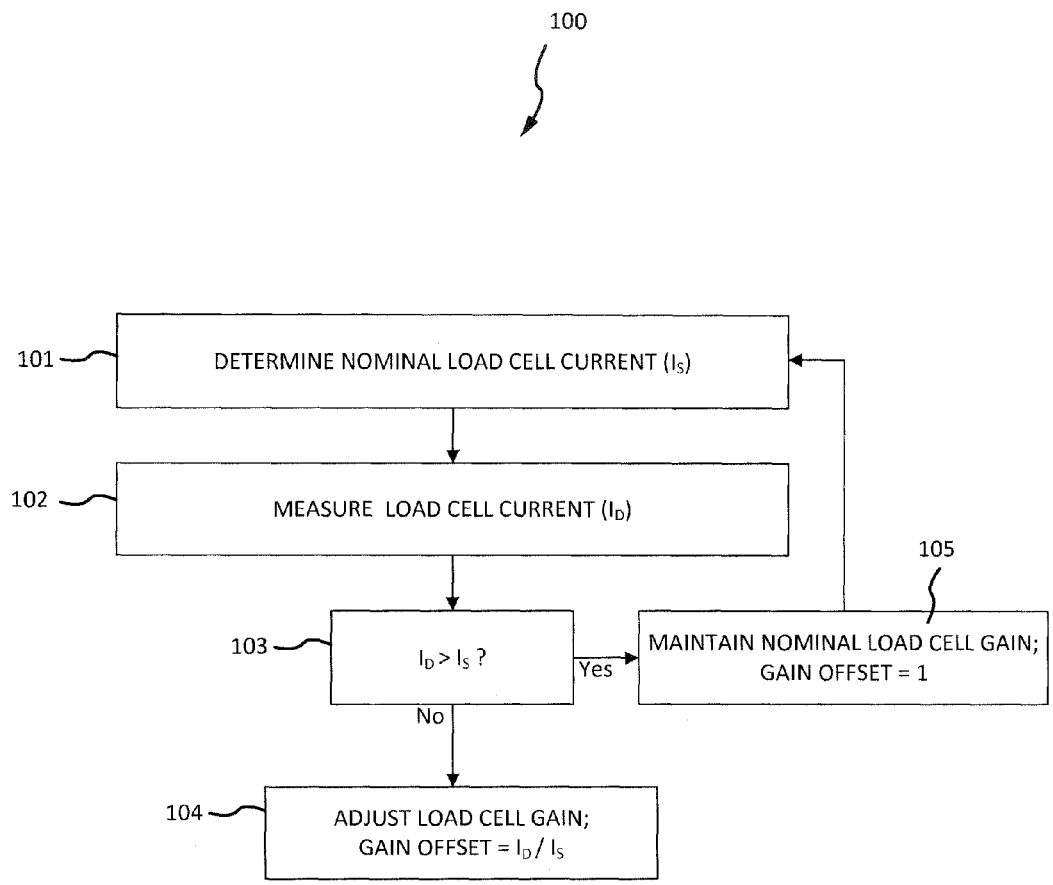
FIG. 2 depicts a flowchart illustrating an example method of load cell gain compensation, in accordance with various embodiments.

Various methods are presented herein to address these challenges. For instance, with reference to FIGS. 1A-B, and also to FIG. 2, a method of load cell gain compensation 100 may comprise determining a nominal load cell current, $I_S$ (Step 101). The nominal load cell current, $I_S$, may be the current that is drawn by the load cell 6 from the EBAC 4 along power wiring 13 during a first operating condition. A first operating condition may comprise a typical operating condition. A first operating condition may comprise an operating condition according to FIG. 1A, wherein a parasitic resistance 14 (FIG. 1B) is absent from the power wiring 13. Typical operating conditions may comprise collecting a rolling average current, or collecting and storing historical current samples taken and specific times, such as start up, shut down, brake actuation, brake release, etc. The current may be correlated to a control signal provided on a control wiring 12 by the EBAC 4 indicating a desired actuation. Thus, the EBAC 4 may store a lookup table of $I_S$ values compared with control signals. The EBAC 4 may measure load cell current, $I_D$ (Step 102). $I_D$ may be the current that is drawn by the load cell 6 from the EBAC 4 along power wiring 13 in substantially real time. The EBAC 4 may compare $I_D$ and $I_S$ and determine whether $I_D < I_S$ is true or false (Step 103). If $I_D$ is greater than $I_S$, the EBAC 4 may maintain a nominal load cell gain (e.g., set a gain offset value equal to 1) (Step 105) and may return to Step 102. If $I_D$ is not greater than $I_S$, the EBAC 4 may adjust a load cell gain offset to equal $$\frac{I_D}{I_S}$$

(Step 104). In this manner, the control signal provided by the EBAC 4 on control wiring 12 may be scaled by multiplication with the load cell gain offset to compensate for parasitic resistance 14 on power wiring 13 introducing an error multiple to the sense voltage on sense wiring 11. In various embodiments, the EBAC 4 may also indicate a system fault in response to the load cell current, $I_D$, being less than a fault threshold. For instance, a fault threshold may comprise a pre-determined value corresponding to such a degree of wire degradation (e.g., parasitic resistance 14 accumulation) that a maintenance action, such as repair and/or replacement of power wires 13 is recommended.

The EBAC 4 may adjust the load cell gain as follows. $R_{LC}$ may comprise a known load cell resistance. $V_S$ may comprise a supply voltage of the EBAC 4 to the load cell 6 on power wiring 13. $I_S$ may be the nominal load cell current. $I_D$ may be the load cell current under instantaneous conditions.

Finally, $R_C$ may be the resistance of parasitic resistance 14. Thus, the EBAC 4 may adjust the load cell gain as follows:

$$\text{Load Cell Gain Offset} = \frac{I_D}{I_S} = \frac{\frac{V_S}{R_{LC}+R_C}}{\frac{V_S}{R_{LC}}} = \frac{R_{LC}}{R_{LC}+R_C}$$

As such, one may further appreciate that:

$$\text{Parasitic Resistance} = R_C = \frac{V_S - I_D \cdot R_{LC}}{I_D}$$

Consequently, the control instructions on the control wiring 12 comprising a control voltage may be scaled by $$\frac{I_D}{I_S}$$

so that the contribution of parasitic resistance 14 to any variation of the sensed voltage may be compensated and the error multiple canceled by the load cell gain offset.

For example, $V_S$ may be 10 volts. A load cell may have a load cell gain of 0.65 mV/V at 10000 lb. (about 4536 kg) of braking force. $R_{LC}$ may be 700 Ohms. Thus, to apply a 6000 lb. (about 2722 kg) braking force, the load cell signal feedback on sense wiring 11 may be 0.39 mV (0.65/10000*6000). The load cell current, $I_S$, may be 14.3 mA (10/700*1000). Over time, corrosion may cause a parasitic resistance 14 in sense wiring 11 of 800 Ohms. With corrosion induced parasitic resistance 14 of 800 Ohms, the load cell current, $I_D$, may become 6.7 mA (10/(800+700)). Thus, the load cell gain of 0.65 mV/V may be offset according to a load cell gain offset of 6.7/14.3. As such, the load cell gain may be dynamically calibrated from 0.65 mV/V to 0.304 mV/V at 10000 lb. (about 4536 kg) of braking force. As a result, a command of 6000 lb. (about 2722 kg) of braking force is now equivalent to an adjusted load cell signal voltage of 0.182 mV. This produces the correct braking force of 6000 lb. (about 2722 kg), in contrast to the 12857 lb. (about 5832 kg) of braking force that would have been produced without the load cell gain offset of 6.7/14.3.

As discussed herein, various aspects of the present disclosure may be implemented in various logical units of a processor having a non-transitory memory. In various embodiments, various aspects may be implemented in multiple processors and/or memories. For example, the disclosed system may be implemented within the EBAC 4. Alternatively, various aspects of the disclosed system may be implemented within the EBAC 4 and/or the EBA 15 and/or the load cell 6 and/or the ABSC 2. Thus, one may appreciate that the ABSC 2 and/or EBAC 4 and/or the EBA 15 may comprise a processor and a tangible, non-transitory memory. For example, the ABSC 2 and/or EBAC 4 may comprise a digital signal processor (DSP).

In various embodiments, while the load cell gain compensation systems and methods described herein have been described in the context of aircraft applications; however, one will appreciate in light of the present disclosure, that the systems and methods described herein may be used in connection with various other vehicles, for example, cars, trucks, busses, trains, boats, and submersible vehicles, or any other vehicle or device, in which control actuation smoothing is desirable, for example, automobile braking systems.

Tangible non-transitory memory as used herein may include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of load cell gain compensation comprising:
   determining, by an electric brake actuator controller, a nominal load cell current during a first operating condition;
   measuring, by the electric brake actuator controller, a load cell current of a load cell of an electric brake actuator;
   comparing, by the electric brake actuator controller, the load cell current and the nominal load cell current; and
   adjusting, by the electric brake actuator controller, a load cell gain in response to the load cell current being less than the nominal load cell current.

2. The method of load cell gain compensation according to claim 1, wherein the adjusting the load cell gain comprises offsetting the load cell gain by a load cell gain offset comprising the load cell current divided by the nominal load cell current.

3. The method of load cell gain compensation according to claim 1, wherein the first operating condition comprises at least one of collecting a rolling average current or collecting and storing a historical current sample.

4. The method of load cell gain compensation according to claim 1, wherein the adjusting the load cell gain comprises decreasing the load cell gain.

5. The method of load cell gain compensation according to claim 1, further comprising indicating, by the electric brake actuator controller, a system fault in response to the load cell current being less than a fault threshold.

6. The method of load cell gain compensation according to claim 1, wherein an aircraft brake and steering controller is in electrical communication with the electric brake actuator controller, further comprising:
   providing, by the electric brake actuator controller, a control voltage to the electric brake actuator in response to a brake actuation instruction.

7. The method of load cell gain compensation according to claim 1, wherein the load cell is proximate to a vehicle brake.

8. The method of load cell gain compensation according to claim 7, wherein the vehicle brake comprises an aircraft main landing gear brake.

9. A brake control system comprising:
   an electric brake actuation controller ("EBAC");
   an electric brake actuator ("EBA");
   a load cell proximate to a brake,
   wherein the EBAC is connected by sense wiring to the load cell and receives a sense voltage from the load cell via the sense wiring,
   wherein the EBAC is connected by power wiring to the load cell and provides a load cell current from the EBAC to the load cell via the power wiring,
   wherein the EBAC is connected by control wiring to the EBA and provides a control voltage to the EBA from the EBAC via the control wiring,
   wherein the EBAC offsets the control voltage in response to the load cell current being less than a nominal load cell current.

10. The brake control system according to claim 9, wherein the EBAC offsets the control voltage by a load cell gain offset comprising the load cell current divided by the nominal load cell current.

11. The brake control system according to claim 9, wherein the EBAC indicates a system fault in response to the load cell current being less than a fault threshold.

12. The brake control system according to claim 9, wherein the EBAC offsets the control voltage by decreasing the control voltage.

13. The brake control system according to claim 9, wherein the brake comprises an aircraft main landing gear brake.

14. The brake control system according to claim 9, wherein the load cell is disposed inside the EBA.

15. The brake control system according to claim 14, wherein the brake actuation instruction comprises an auto braking command.

16. A brake control system comprising:
    an electric brake actuation controller ("EBAC");
    sense wiring connected to the EBAC, wherein the EBAC is configured to receive a sense voltage from a load cell via the sense wiring;
    power wiring connected to the EBAC, wherein the EBAC is configured to provide a load cell current to the load cell via the power wiring;
    control wiring connected to the EBAC, wherein the EBAC is configured to provide a control voltage to an electric brake actuator ("EBA") via the control wiring,
    wherein the EBAC offsets the control voltage in response to the load cell current being less than a nominal load cell current.

17. The brake control system of claim 16, wherein the EBAC offsets the control voltage by a load cell gain offset comprising the load cell current divided by the nominal load cell current.

18. The brake control system of claim 16, wherein the EBAC indicates a system fault in response to the load cell current being less than a fault threshold.

19. The brake control system according to claim 16, wherein the EBAC offsets the control voltage by decreasing the control voltage.

20. The brake control system according to claim 16, wherein the EBAC is configured to receive a brake actuation instruction from an aircraft brake and steering controller ("ABSC"), wherein the EBAC provides the control voltage in response to the brake actuation instruction.

* * * * *